Aug. 30, 1955  E. S. MacPHERSON  2,716,461
RESILIENT MOUNTING OF MOTOR VEHICLE DRIVE UNITS
Filed Nov. 6, 1951  3 Sheets-Sheet 1
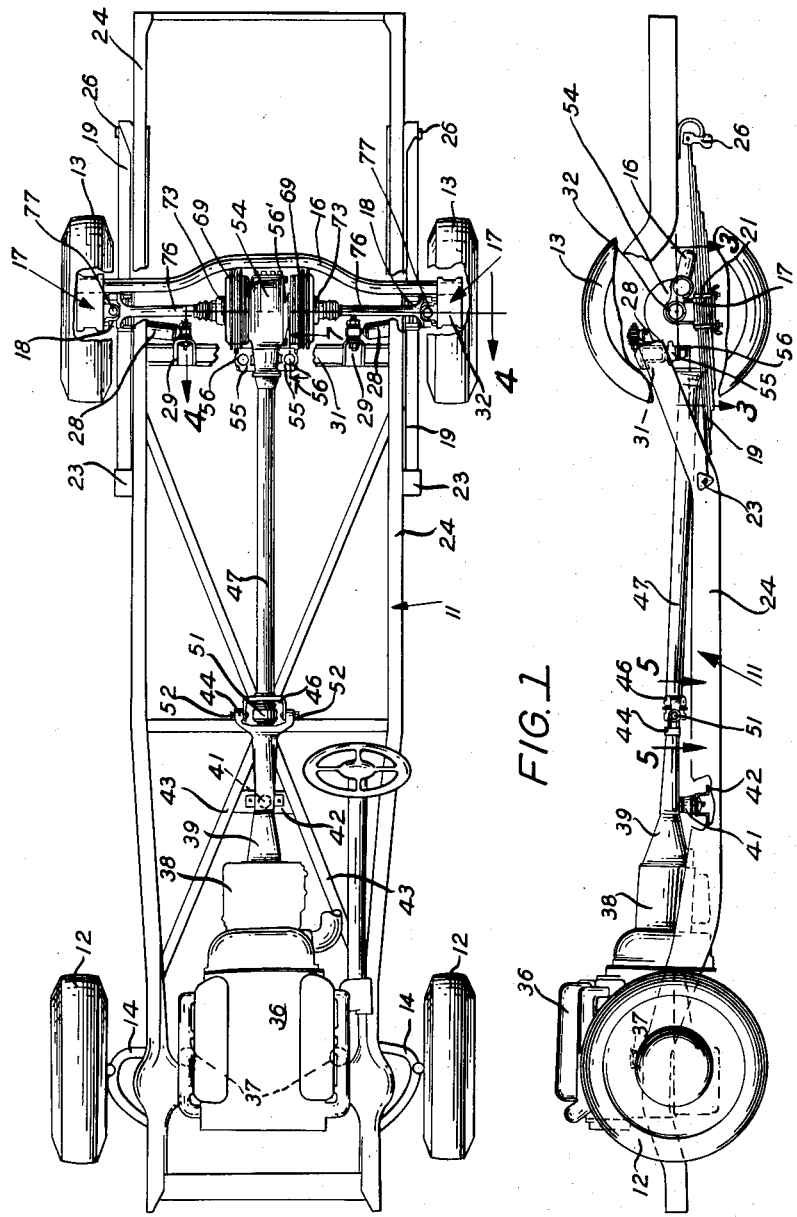
E. S. MacPHERSON
INVENTOR.
BY E.C. McRae
J. R. Faulkner
L. H. Oster
ATTORNEYS Aug. 30, 1955 E. S. MacPHERSON 2,716,461
RESILIENT MOUNTING OF MOTOR VEHICLE DRIVE UNITS
Filed Nov. 6, 1951 3 Sheets-Sheet 2

E. S. MacPHERSON
INVENTOR.

BY E.C. McRae
J.R. Faulkner
J.H. Oster
ATTORNEYS

Aug. 30, 1955   E. S. MacPHERSON   2,716,461
RESILIENT MOUNTING OF MOTOR VEHICLE DRIVE UNITS
Filed Nov. 6, 1951   3 Sheets-Sheet 3

E. S. MacPHERSON
INVENTOR.

BY
ATTORNEYS

United States Patent Office 2,716,461
Patented Aug. 30, 1955

2,716,461

RESILIENT MOUNTING OF MOTOR VEHICLE DRIVE UNITS

Earle S. MacPherson, Huntington Woods, Mich., assignor to Ford Motor Company, Dearborn, Mich., a corporation of Delaware Application November 6, 1951, Serial No. 255,008

2 Claims. (Cl. 180—64)

This invention relates generally to motor vehicle chassis construction, and has particular reference to the power train, rear axle, and rear wheel suspension of the vehicle.

An object of the present invention is to provide an improved motor vehicle chassis construction in which a De Dion type rear axle is used but in which the driving and braking torque are transferred to the vehicle frame at widely spaced points to minimize the forces and make possible the utilization of softer mounting means. The invention contemplates the mounting of the differential unit upon the rearward portion of the vehicle frame by means of resilient mounting means, together with a relatively long torque tube rigidly connected at its rearward end to the differential unit and pivotally connected at its forward end to the rearward portion of the vehicle power unit for relative pivotal movement therewith about a transverse horizontal axis. The construction enables the driving and braking torque to be taken by the resilient mounting means for the differential unit and the resilient mounting means for the power unit. A relatively long torque arm is thus provided, obtaining improved operating characteristics over the conventional De Dion type axle in which the differential housing is supported upon the frame at rather closely spaced points. Compared to the conventional Hotchkiss drive, the arrangement has the advantage of eliminating the driving and braking torque loads from the rear leaf springs to not only avoid wheel hop caused by the windup of the springs by such loads, but also enabling the rear springs to be designed to take only the linear horizontal propelling and retarding forces and the vertical weight loads, thus simplifying the construction of the springs and permitting them to be more efficiently designed.

Another object of the invention is to provide a motor vehicle chassis construction having a minimum of sprung weight to improve the riding characteristics of the vehicle, and in which the effects of engine shake at acceleration and car roll due to driving torque reaction are minimized. A still further object of the invention is to provide a motor vehicle chassis construction in which satisfactory road clearance can be obtained and yet in which the vehicle floor and the floor of the luggage compartment can be materially lowered to not only provide additional space in the vehicle but also to permit wider latitude in styling the vehicle body.

A further object of the invention is to provide a motor vehicle chassis construction in which the engine torque is balanced within the rubber mounted drive unit so that the engine torque is not transmitted to the vehicle frame in an unbalanced manner.

Other objects and advantages of the invention will be made more apparent as this description proceeds, particularly when considered in connection with the drawings, in which:

Figure 1 is a semi-diagrammatic plan view of a motor vehicle chassis incorporating the present invention.

Figure 2 is a side-elevational view of the construction shown in Figure 1.

Figure 4:
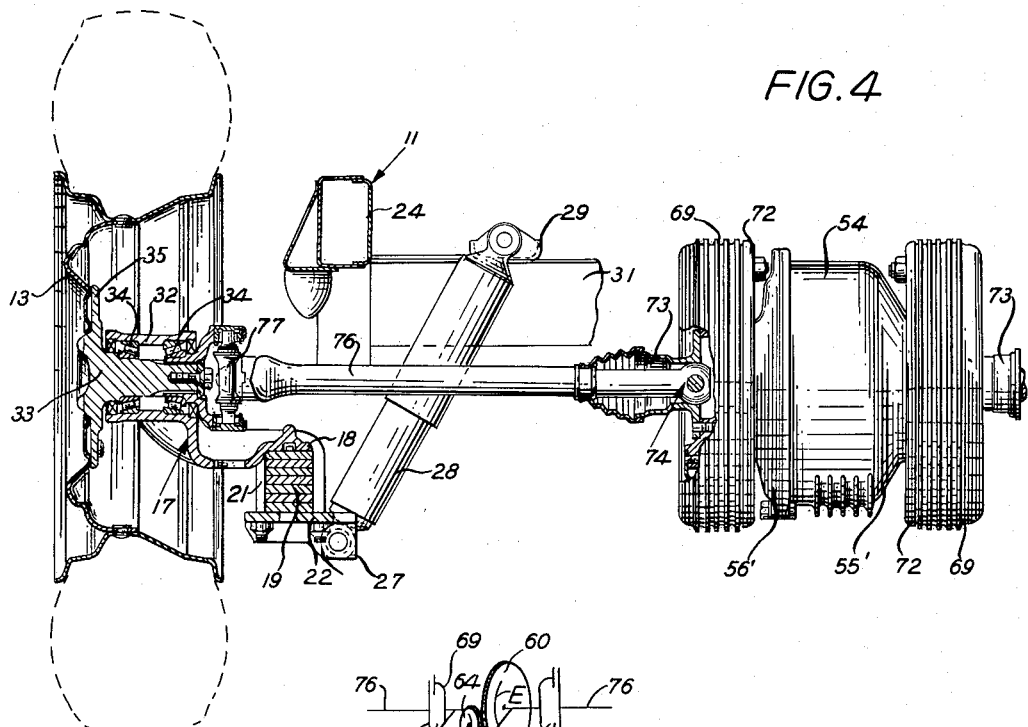
Figure 4 is an enlarged vertical transverse cross-sectional view, partly in elevation, taken on the line 4—4 of Figure 1.

Referring now to the drawings, and particularly to Figures 1 and 2, the reference character 11 indicates the frame of the vehicle and the reference characters 12 and 13 the front and rear wheels thereof. The front wheels 12 are independently suspended from the frame 11 by means of conventional suspension arms 14 and coil springs (not shown). The rear wheels 13 are interconnected by means of a sub-axle 16 in the form of a tubular member extending transversely of the frame between the rear wheels. As best seen in Figure 1 the ends of the sub-axle 16 are received within and secured to wheel supporting members 17. Referring now to Figure 4, each wheel supporting member 17 has an inwardly extending flange 18 connected to an intermediate portion of a longitudinally extending rear leaf spring 19 by means of shackle bolts 21 and a clamping plate 22. The forward end of each leaf spring 19 is pivotally connected to a bracket 23 mounted upon the side rail 24 of the vehicle frame 11, while the rear end of each spring is connected to the side rail by means of a spring shackle 26. The spring plate 22 is provided with a flange 27 to which is connected the lower portion of a tubular shock absorber 28, the upper end of which is pivotally connected to a bracket 29 secured to a cross member 31.

Each wheel supporting member 17 also has integrally formed therewith a sleeve portion 32, Figure 4, within which the rear wheel spindle 33 is rotatably mounted by means of tapered roller bearings 34. The flange 35 of the wheel spindle 33 supports the rear wheel 13.

Turning now to the power train of the vehicle chassis, the reference character 36 indicates a conventional internal combustion engine supported upon the forward portion of the vehicle frame 11 by means of a pair of conventional transversely spaced rubber engine mounts 37. Secured to the rearward portion of the engine 36 is a transmission 38 which in turn is connected to a transmission extension housing 39. A single rubber mounting 41 supports the transmission extension housing 39 upon a short cross-frame member 42 extending between the X-frame members 43 to complete a three point triangular mounting for the vehicle power unit.

Figures 5, 7:
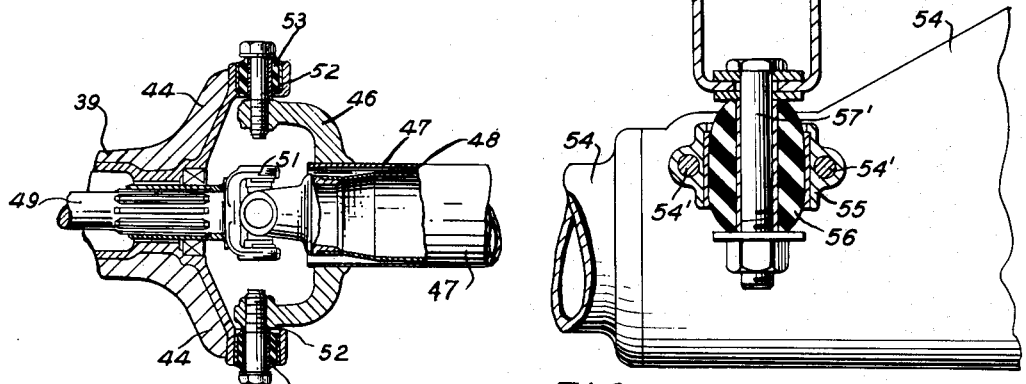
Figure 5 is an enlarged horizontal cross-sectional view taken on the line 5—5 of Figure 2.
Figure 7 is an enlarged vertical cross-sectional view taken on the line 7—7 of Figure 1.

As best seen in Figures 1 and 5, the rearward portion of the transmission extension housing 39 is formed with an integral bifurcated fork portion 44 embracing a bifurcated fork 46 provided at the forward end of the longitudinally extending torque tube 47. The torque tube 47 houses the propeller shaft 48 which is interconnected at its forward end to the rearward end of the transmission drive shaft 49 by means of a conventional universal joint 51.

The bifurcations of the forked forward end 46 of the torque tube threadedly receive pivot studs 52 which in turn are pivotally connected to the bifurcations of the forked rearward end portion 44 of the transmission extension housing 39 by means of rubber bushings 53. It will be noted that the forward end of the torque tube 47 is thus pivotally connected to the rearward end of the power unit for relative rotation about a transverse horizontal axis through the pivot studs 52. The universal joint 51 is of course in alignment with this axis.

The rearward end of the torque tube 47 is rigidly connected to the forward extremity of the differential housing 54. Brackets 55 are bolted to opposite sides of the forward portion of the differential housing 54 by studs 54' and receive shear type rubber mounts 56 secured to and depending from the U-shaped cross-frame member 31 by means of bolts 57'. It will be noted that the differential housing 54 is thus supported upon the vehicle frame and forms part of the sprung weight of the vehicle.

Figure 3:
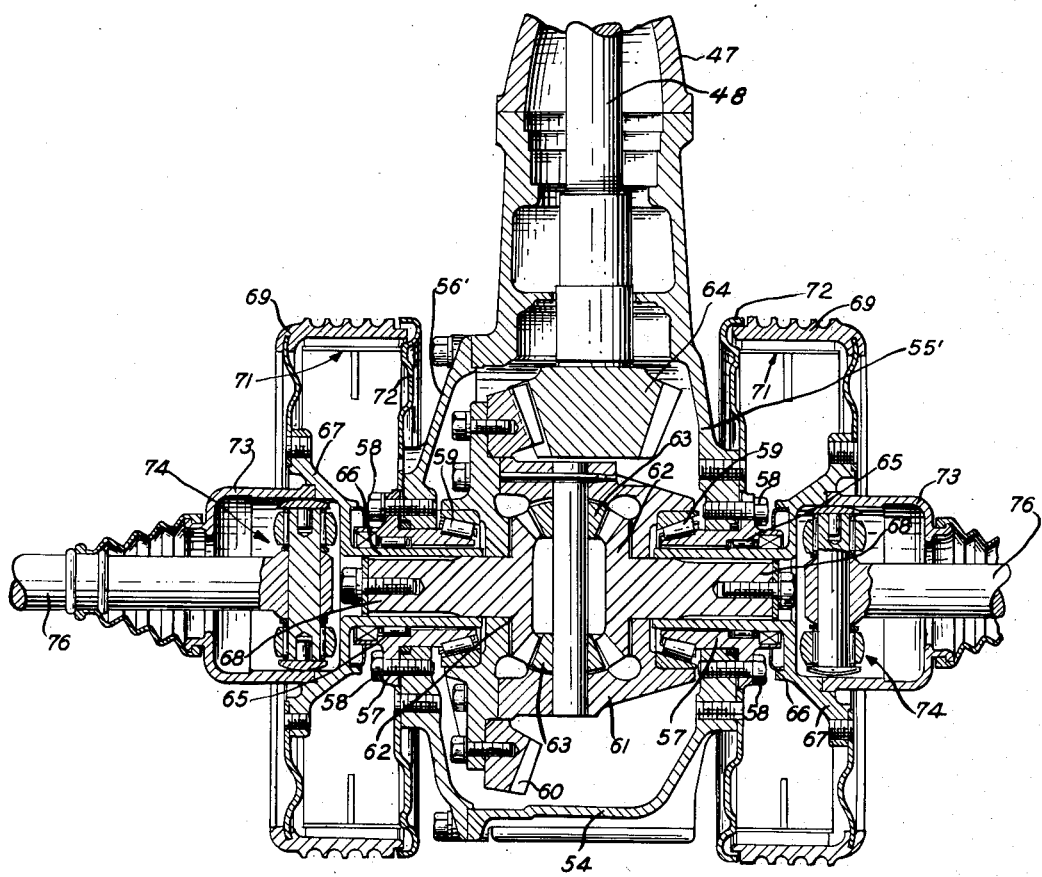
Figure 3 is an enlarged horizontal cross-sectional view through the differential unit, taken on the line 3—3 of Figure 2.

With reference now to Figure 3, the differential housing 54 has an integral side flange 55' and an opposite open side closed by a cover plate 56'. The side flange 55' and the cover plate 56' are generally cone-shaped and ribbed for strength, and support flanged hardened sleeves 57 which are secured thereto by bolts 58. Shims are provided between the flanges of the sleeves 57 and the adjacent cover plate or housing flange to permit lateral adjustment.

Each sleeve 57 is formed with a hardened outer race for the tapered roller bearings 59 for the differential unit. The differential unit is conventional in construction and includes a driving gear 60 carrying a gear case 61 enclosing differential side gears 62 and bevel pinions 63. The driving gear 60 meshes with a driving pinion 64 carried at the rearward end of the propeller shaft 48.

The hardened sleeves 57 also have inner races for needle bearings 65 which pilot sleeves 66 of hub members 67. Sleeves 66 are splined to the stub shafts 68 of the differential side gears 62. The hub members 67 support brake drums 69 cooperating with conventional internal expanding brakes 71 carried by backing plates 72 supported upon the differential housing 54 and the housing cover plate 56. Each hub member 67 has secured thereto a housing 73 of a sliding block or pot type universal joint 74 connected to the inner end of the axle shaft 76. With reference to Figure 4 it will be seen that the axle shafts 76 are connected at their outer ends to the rear wheel spindles 33 by means of universal joints 77, completing the power train from the vehicle power unit to the rear driving wheels.

It will be seen that with the foregoing construction the unsprung weight at the rear of the vehicle is minimized since the differential unit and rear wheel brakes are entirely supported upon the vehicle frame. This arrangement also enables the floor of the passenger compartment of the vehicle as well as the floor of the rear luggage compartment to be lowered with relation to conventional type chassis constructions, thus providing additional space as well as facilitating desirable styling features by permitting the rearward portion of the body to be somewhat lowered. In addition it will be noted that the rear leaf springs need only be designed to take the longitudinal propelling and retarding forces of the vehicle together with the vertical weight loads since the driving and braking torque loads are not imposed upon the springs. The springs can thus be advantageously designed to efficiently perform these functions, and wheel hop is eliminated since the springs cannot wind up as is the case in conventional Hotchkiss drive vehicles in which the springs must take the driving and braking torque.

In the conventional De Dion type rear axle construction the differential unit is directly connected to the vehicle frame at longitudinally spaced points, usually at the front and rear portions of the differential housing. These mountings are located quite close to each other and consequently only a relatively short torque arm is available to transmit the driving and braking torque to the frame. Consequently relatively rigid mounting devices must be used. With the present arrangement, however, the interconnected torque tube 47 and differential housing 54 provide a relatively long torque arm for transferring the driving and braking torque. This torque arm is equal to the distance between the axis of the pivot studs 52 at the forward end of the torque tube 47 and the axis of the rubber mounts 56 connecting the differential housing to the frame. Since this torque arm is long, the loads are considerably smaller, and relatively soft rubber mounts 56 can be utilized between the differential unit and the frame thus providing a quieter, more satisfactory mounting for the latter. At the forward end of the torque tube 47 the forces produced by the driving and braking torque are transferred through the rubber bushings 53 to the rearward end of the transmission extension housing 39. Inasmuch as the engine 36, transmission 38 and transmission extension housing 39 are rigidly connected together, these loads are transmitted to the rubber mounts 37 and 41 supporting the power unit upon the vehicle frame. These loads are relatively small in magnitude due to the long torque arm and to the distribution between the rubber mounts, and consequently relatively soft mounting units can be provided contributing to vehicle quietness and smoothness.

Figure 6:
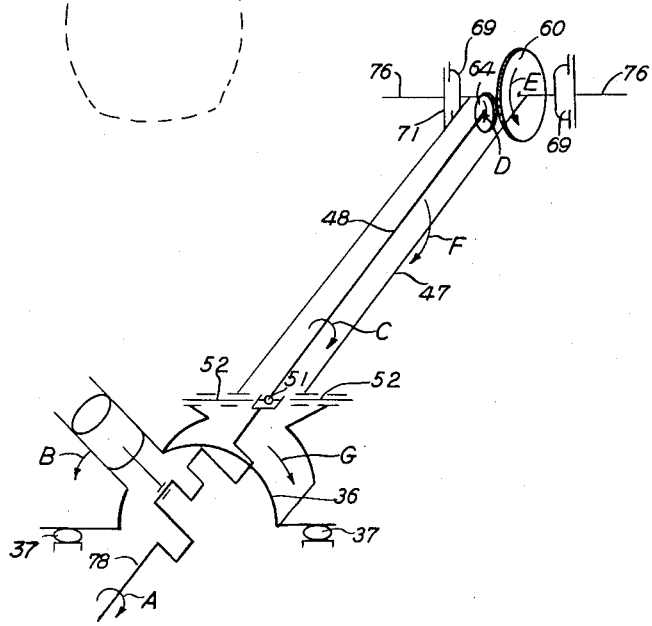
Figure 6 is a diagrammatic sketch illustrating the power train of the present invention and the forces therein.

Figure 6 illustrates diagrammatically the power train of the present invention. The arrow A represents the engine torque at the crankshaft 78 of the engine 36. This engine torque produces an equal and opposite torque reaction B in the block of the engine. In conventional chassis constructions this torque reaction is impressed upon the frame through the engine mounts 37 in an unbalanced manner.

In the present invention the engine torque is transmitted from the engine crankshaft 78 through the transmission (not shown in the diagrammatic view) and the universal joint 51 to the propeller shaft 48, the rearward end of which drives the driving pinion 64 of the rear axle. Arrows C and D represent the torque in the propeller shaft and driving pinion respectively. The driving pinion 64 meshes with the ring gear 60, with the arrow E representing the torque therein. The torque reaction in the differential housing 54 is transmitted to the torque tube 47 which is rigidly connected thereto, and is shown by the arrow F. This torque reaction is transmitted from the torque tube 47 to the engine 36 (arrow G) since the connection between the torque tube and the engine is a pivotal connection about the horizontal transverse axis formed by the pivot pins 52. Inasmuch as torque reactions B and G are equal and in opposite directions it will be apparent that a balanced condition is obtained and unbalanced forces are not transmitted to the vehicle frame through the engine mounts 37.

The balanced torque reaction discussed above cannot be obtained with conventional chassis arrangements, nor with the ordinary De Dion type construction. The present invention achieves these results by combining a De Dion type rear axle with a torque tube rigidly connected to the differential housing at its rearward end and pivotally connected to the engine assembly at its forward end for pivotal movement about a horizontal transverse axis.

It will be understood that the invention is not to be limited to the exact construction shown and described, but that various changes and modifications may be made without departing from the spirit and scope of the invention, as defined in the appended claims.

What is claimed is:

1. In a motor vehicle chassis, a frame, front steerable wheels and rear driving wheels, a power unit, a pair of laterally spaced resilient mounts adjacent the front wheels supporting the opposite sides of said power unit upon said frame, a transmission unit rigidly connected to the rearward end of said power unit and extending rearwardly therefrom, a resilient mount supporting said transmission unit upon said frame intermediate the front and rear ends of said transmission unit, said transmission unit having a bifurcated portion at its rearward end, a torque tube extending rearwardly of said vehicle and having a bifurcated portion at its forward end pivotally connected to the bifurcated end portion of said transmission unit for pivotal movement about a transverse horizontal axis with said axis being located a substantial distance rearwardly of said last-mentioned resilient mount, a differential housing rigidly secured to the rearward end of said torque tube, differential mechanism within said housing, axles extending outwardly from said differential mechanism to the rear driving road wheels, a frame cross member extending transversely across said frame forwardly of said axles and spaced above the forward portion of said differential housing, laterally outwardly projecting supports at opposite sides of the forward portion of said differential housing, a pair of transversely aligned resilient mounts depending from said frame cross member and connected at their lower ends to said laterally projecting supports, a rigid sub-axle extending transversely of said vehicle rearwardly of said differential housing but independent thereof and rotatably supporting the rear driving wheels at the opposite ends thereof, and springs between said frame and said rear wheels, said springs transferring the horizontal propelling and retarding forces to said frame and said interconnected differential housing, torque tube, transmission unit and power unit transferring driving and braking torque to said frame and dividing this latter torque between the resilient mounts supporting the power unit, transmission unit and differential housing.

2. In a motor vehicle chassis, a frame, front steerable wheels and rear driving wheels, a power unit, a pair of laterally spaced resilient mounts adjacent the front wheels supporting the opposite sides of said power unit upon said frame, a transmission unit rigidly connected to the rearward end of said power unit and extending rearwardly therefrom, a resilient mount supporting said transmission unit upon said frame intermediate the front and rear ends of said transmission unit, said transmission unit having a bifurcated portion at its rearward end, a torque tube extending rearwardly of said vehicle and having a bifurcated portion at its forward end pivotally connected to the bifurcated end portion of said transmission unit for pivotal movement about a transverse horizontal axis with said axis being located a substantial distance rearwardly of said last-mentioned resilient mount, a differential housing rigidly secured to the rearward end of said torque tube, differential mechanism within said housing, axles extending outwardly from said differential mechanism to the rear driving road wheels, a frame cross member extending transversely across said frame above said differential housing, a pair of transversely aligned resilient mounts depending from said frame cross member and connected at their lower ends to said differential housing, and springs between said frame and said rear wheels, said springs transferring the horizontal propelling and retarding forces to said frame and said interconnected differential housing, torque tube, transmission unit and power unit transferring driving and braking torque to said frame and dividing this latter torque between the resilient mounts supporting the power unit, transmission unit and differential housing.

References Cited in the file of this patent

UNITED STATES PATENTS

| | | |
|---|---|---|
| 1,085,869 | Lancia | Feb. 3, 1914 |
| 1,316,248 | Latham | Sept. 16, 1917 |
| 1,324,855 | Taylor | Dec. 16, 1919 |
| 1,564,733 | Weaver | Dec. 8, 1925 |
| 1,694,049 | Wright | Dec. 4, 1928 |
| 1,711,765 | Wright | May 7, 1929 |
| 2,010,415 | Roller | Aug. 6, 1935 |
| 2,022,102 | Anibal | Nov. 26, 1935 |
| 2,112,628 | Lee | Mar. 29, 1938 |
| 2,208,709 | Tjaarda | July 30, 1940 |
| 2,311,143 | Wahlberg | Feb. 16, 1943 |
| 2,417,214 | Roos | May 11, 1947 |